(12) United States Patent
Dondolini

(10) Patent No.: US 10,965,160 B2
(45) Date of Patent: Mar. 30, 2021

(54) METHOD AND DEVICE FOR OBTAINING POWER INTENDED TO SUPPLY A CONSUMING APPLIANCE FROM A CONDUCTOR TRAVERSED BY AN ALTERNATING ELECTRICAL CURRENT

(71) Applicant: TIXON ENERGY S.r.l., Milan (IT)

(72) Inventor: Alessandro Dondolini, Rapallo (IT)

(73) Assignee: TIXON ENERGY S.r.l., Milan (IT)

( * ) Notice: Subject to any disclaimer, the term of this patent is extended or adjusted under 35 U.S.C. 154(b) by 343 days.

(21) Appl. No.: 15/773,446

(22) PCT Filed: Nov. 5, 2015

(86) PCT No.: PCT/IB2015/058555
§ 371 (c)(1),
(2) Date: May 3, 2018

(87) PCT Pub. No.: WO2017/077365
PCT Pub. Date: May 11, 2017

(65) Prior Publication Data
US 2018/0323649 A1 Nov. 8, 2018

(51) Int. Cl.
*H02J 50/12* (2016.01)
*H01F 38/14* (2006.01)
*H02J 50/10* (2016.01)

(52) U.S. Cl.
CPC .............. *H02J 50/12* (2016.02); *H01F 38/14* (2013.01); *H02J 50/10* (2016.02)

(58) Field of Classification Search
CPC ......... H01F 38/14; H02J 50/001; H02J 50/10; H02J 50/12
See application file for complete search history.

(56) References Cited

U.S. PATENT DOCUMENTS 4,808,916 A * 2/1989 Smith-Vaniz ........ G01R 15/142
324/110
2002/0181253 A1 12/2002 Watanabe

FOREIGN PATENT DOCUMENTS

| EP | 0267595 A1 | 5/1988 |
| IT | 01391387 | 1/2008 |
| IT | TO20080016 A1 * | 10/2008 |
| IT | 020080016 A1 | 7/2009 |

(Continued)

OTHER PUBLICATIONS

Translation of IT-TO20080016-A1 (Year: 2008).*
PCT/IB2015/058555 International Search Report dated Jul. 11, 2016.

*Primary Examiner* — Rexford N Barnie
*Assistant Examiner* — Elim Ortiz
(74) *Attorney, Agent, or Firm* — Arent Fox LLP; Michael Fainberg

(57) ABSTRACT

A method and a device are described for obtaining power intended to supply a consuming appliance from a conductor traversed by a primary electrical current, in which a core of magnetic material and a conductive solenoid wound about the core are positioned in a position remote from the conductor to obtain a secondary current in the solenoid from a magnetic field flux generated in the solenoid by the conductor, core and solenoid. The conductive solenoid is connected to the consuming appliance by a circuit adapted to convert the secondary current into a power intended to supply the consuming appliance through a related voltage and output current.

5 Claims, 14 Drawing Sheets

(56) References Cited

FOREIGN PATENT DOCUMENTS

| IT | TO20080016 A1 * | 7/2009 |
|---|---|---|
| WO | 99/26329 A1 | 5/1999 |
| WO | 2010005324 A1 | 1/2010 |
| WO | 2012/015942 A1 | 2/2012 |

* cited by examiner

METHOD AND DEVICE FOR OBTAINING POWER INTENDED TO SUPPLY A CONSUMING APPLIANCE FROM A CONDUCTOR TRAVERSED BY AN ALTERNATING ELECTRICAL CURRENT

CROSS-REFERENCE TO RELATED APPLICATIONS

This application is the U.S. National Stage Application of International Patent Application No. PCT/IB2015/058555, filed on Nov. 5, 2015 the contents of which is incorporated herein by reference in its entirety.

FIELD OF TECHNOLOGY

The present invention relates to a method and a device for obtaining a power intended to supply a consuming appliance from a conductor traversed by an alternating electrical current.

BACKGROUND

The description below refers, as a preferred embodiment, to a method for extracting power used in a power transmission line, and to a device for obtaining power for a consuming appliance that is intended to be mounted on a supporting structure for a power transmission line, in particular for example on a pylon of a distribution network for medium-, high- and very-high-voltage electricity (MV, HV or HHV).

However, the invention should be understood to be viable and applicable to any system in which there is at least one conductor traversed by an alternating electrical current, the references to power transmission lines not being limiting.

In recent years, the need has arisen to draw electrical power for consuming appliances from conductors traversed by a current, in particular in relation to power transmission lines.

Indeed, the need to provide electricity distribution networks with electronic monitoring and control equipment has increased significantly in recent years, both on account of safety requirements and the need to obtain measured electrical parameters within the network (smart networks). In general, the aforementioned control equipment includes a power supply module able to generate the electrical power (in particular electrical current) required to power the control equipment.

A known device for obtaining power to supply a consuming appliance (hereinafter referred to more simply using the term "power supply module") is described in Italian patent IT 1 391 387.

WO 2010/005324 and WO 99/26329 describe inductively coupled power transfer systems designed to operate in the vicinity of a magnetic field generated by a controlled primary circuit. WO 2010/005324 includes resistive means such as MOS transistors used in linear mode to limit the electrical power to the load, which are subject to disadvantageous power dissipation and therefore offer low overall system efficiency. WO 99/26329 includes means for limiting the power for saturation of a magnetic core induced by the flow of a direct current, which are also subject to power dissipation and offer low overall efficiency.

SUMMARY

The object of the present invention is to propose a method and a device for obtaining power intended to supply a consuming appliance from a conductor traversed by an uncontrollable electrical current, that makes it possible to increase and improve control of the power (or current) generated and supplied to the consuming appliance, while guaranteeing protection from extra currents on the conductor without dissipation of the available power, providing high efficiency.

This and other objects are achieved by the present invention using a method according to Claim 1 and a device according to Claim 5.

Advantageous embodiments and details of the present invention are covered in the dependent claims that are an integral part of the present description.

BRIEF DESCRIPTION OF THE DRAWINGS

Further characteristics and advantages of the present invention are set out in the detailed description below, provided purely as a non-limiting example, with particular reference to the attached drawings, in which.

DETAILED DESCRIPTION

In the description below, all references made to power transmission lines should be considered to be qualitatively independent of the form of the pylon, the number of conductors (single or double circuit) and the voltage of the electrode.

The method and the device (or power supply module) according to the present invention are described progressively with reference to the structure of a power transmission line, but are also applicable to individual conductors traversed by an alternating electric current.

Figure 1:
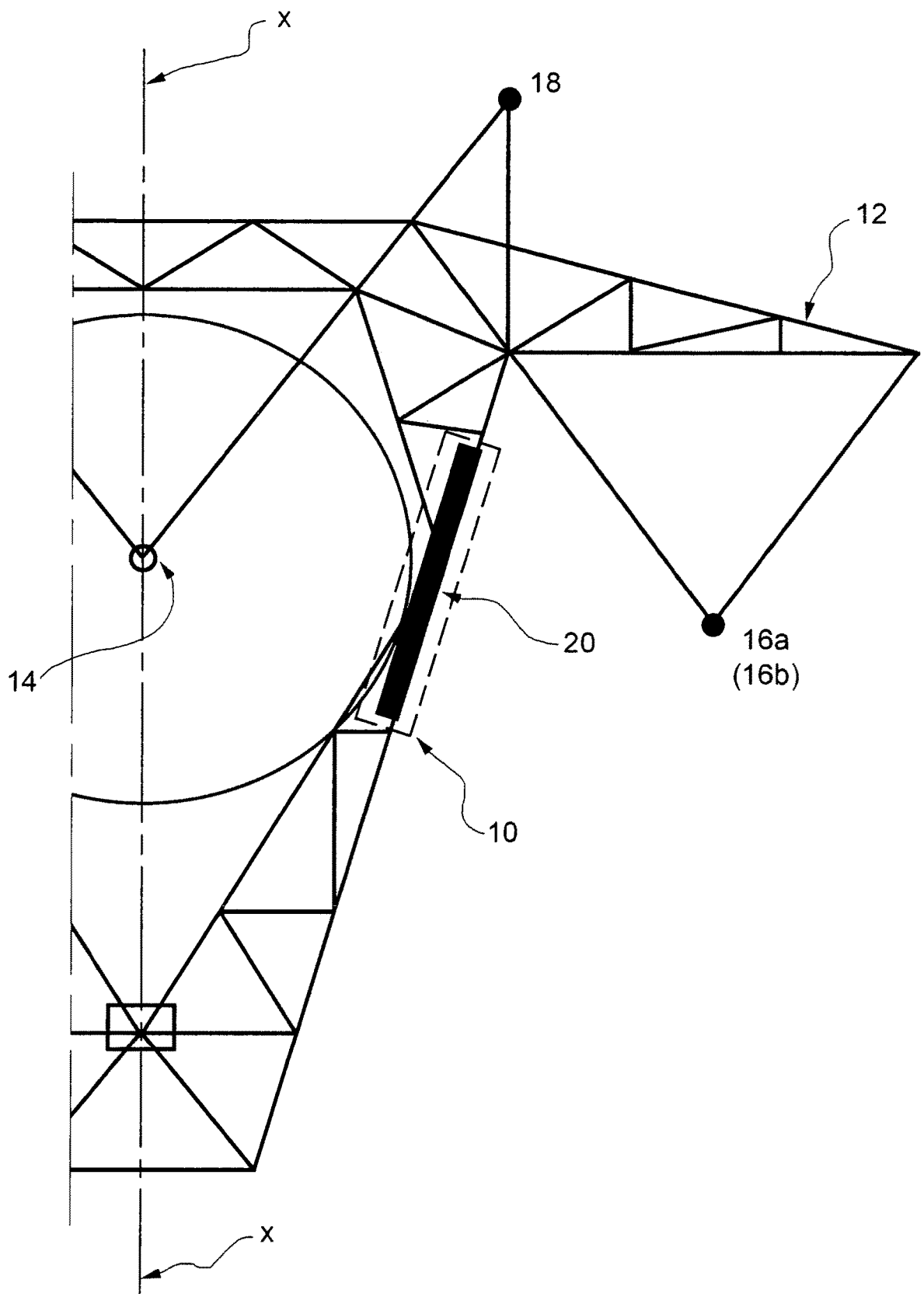
FIG. 1 is a front elevation of an example embodiment of a power supply module according to the present invention mounted on a pylon of a distribution network.

In FIG. 1, reference sign 10 indicates an example embodiment of the power supply module according to the present invention. The power supply module 10 is mounted on a supporting structure (such as a pylon 12) of a single-circuit 380 kV power transmission line, which is not illustrated as a whole.

FIG. 1 shows only the portion of the pylon 12 located on one side of the axis of symmetry X-X of same. The pylon 12 carries a central overhead conductor cable 14 and first and second lateral overhead conductor cables 16a, 16b, of which only the first is shown in the figures. The conductor cables 14, 16a and 16b advantageously form a three-phase electricity distribution system. The pylon 12 is also connected to at least one overhead protection cable 18.

Figure 2:
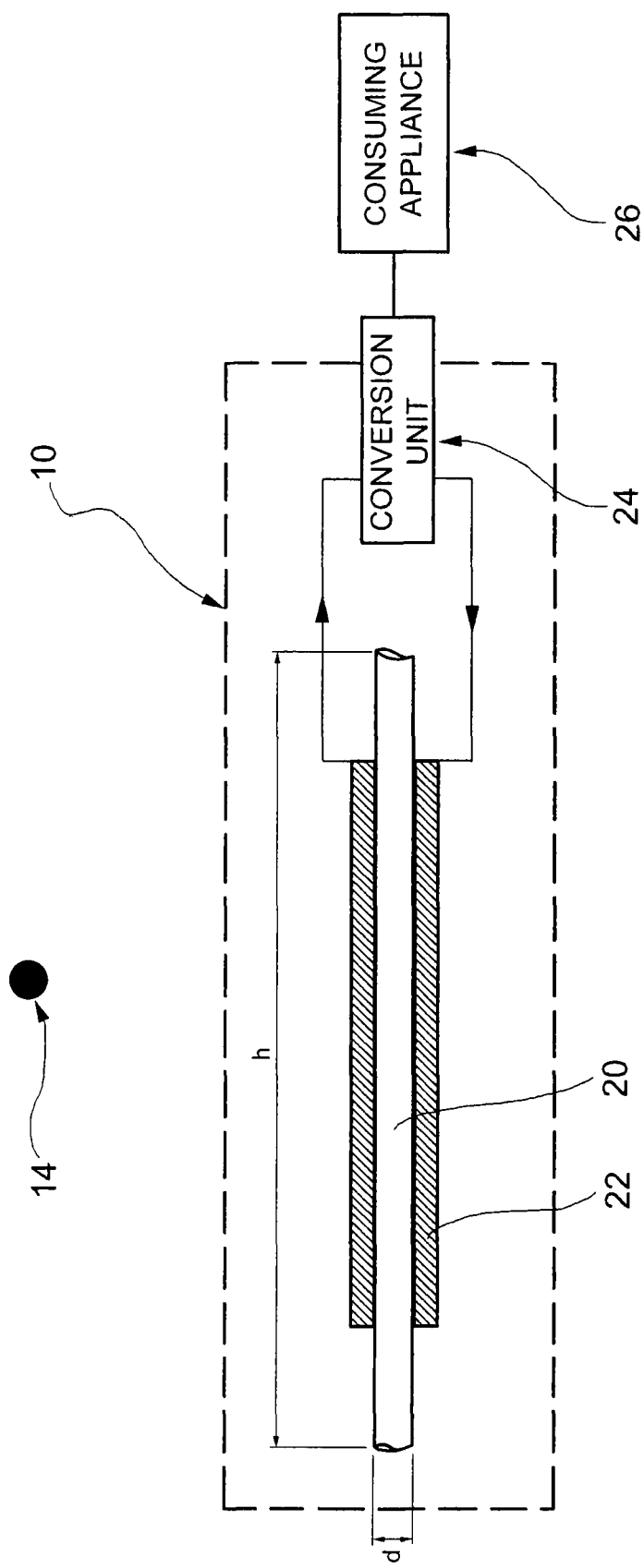
FIG. 2 is a schematic perspective view of the power supply module in FIG. 1.

FIG. 2 is a schematic perspective view of the power supply module in FIG. 1. The power supply module 10 includes a magnetic core 20 of length h and diameter d including preferably a set of ferromagnetic bars that is able to convey a portion of the magnetic field flux induced by the conductor cables 14, 16a and 16b. For the sake of simplicity and clarity, FIG. 2 shows only the central conductor cable 14.

The core 20 can be positioned remotely from the conductors 14, 16a and 16b, or be separated from same by a predetermined distance, preferably equal to 1 cm per kV of voltage in the conductors 14, 16a and 16b (in air).

The power supply module 10 includes a conductive solenoid 22 preferably having N copper turns and wound about the magnetic core 20. The conductive solenoid 22 is connected to a conversion unit 24, described in detail below, that is adapted to convert the portion of the magnetic field flux conveyed by the conductors 14, 16a, 16b, by the magnetic core 20 and by the solenoid 22 into output electrical energy (or current) intended to power a consuming appliance 26, as described in detail below.

Consequently, the magnetic core 20 and the conductive solenoid 22 work as conversion means that transform a portion of the magnetic field flux induced by the overhead conductors 14, 16a, 16b into output electricity to power the consuming appliance 26, without there being any electrical contact with the conductors 14, 16a and 16b of the power transmission line.

It should be noted that the distance between the core 20 and said conductors (up to 5 m), the linear shape of the core itself (with an open magnetic circuit), and the impossibility of controlling the current flowing in the conductors make the present capture system absolutely unique in capturing magnetic power from energized cables, operating at entirely safe distances.

A description of the physical principles on which operation of the power supply module 10 according to the present invention is based is given below.

For the sake of simplicity and clarity, the considerations set out below make reference to a system including the power supply module 10 and the single central conductor 14.

The central conductor cable 14 carrying an alternating current therefore represents a magnetic field source also referred to as the primary circuit. The magnetic field generated by the primary circuit is captured by the magnetic core 20 on which the solenoid 22 is arranged. This solenoid 22 is also referred to as the secondary winding or circuit.

The secondary circuit powers the consuming appliance 26, and the power supply module 10 must be dimensioned to transfer the maximum real power.

A bar of magnetic material (the magnetic core 20) on which a winding (the solenoid 22) is wound and that is immersed in a magnetic field generated by a rectilinear single-phase conductor such as the central conductor 14 (for which it is assumed in a known manner that the current lines extend to infinity) positioned in a plane perpendicular to the bar itself, is affected by two magnetic fluxes, a primary flux $\Phi_{PS}$ and a secondary flux $\Phi_{SS}$.

The primary flux $\Phi_{PS}$, generated by a primary current $I_P$ flowing through the central conductor 14, connects with the N turns of the secondary winding 22 resulting in a primary winding flux $\Phi_P$ equal to:

$$\Phi_P = N * \Phi_{PS} \tag{1}$$

The secondary flux $\Phi_{SS}$, generated by the current flowing through the solenoid 22, connects with the N turns of the secondary winding 22 resulting in a secondary winding flux $\Phi_S$ equal to:

$$\Phi_S = N * \Phi_{SS} \tag{2}$$

The primary winding flux $\Phi_P$, generated by the primary current $I_P$ flowing from the central conductor 14 and that is connected with the magnetic core 20, is equal to:

$$\Phi_P = M * I_P \tag{3}$$

where M is the mutual inductance coefficient between the central conductor 14 and the secondary winding 22.

This primary winding flux $\Phi_P$ generates a no-load voltage $V_0$ on the N turns of the secondary winding 22 equal to:

$$V_0 = \omega * \Phi_P = \omega * M * I_P \tag{4}$$

where $\omega$ is the angular frequency.

Figure 3:
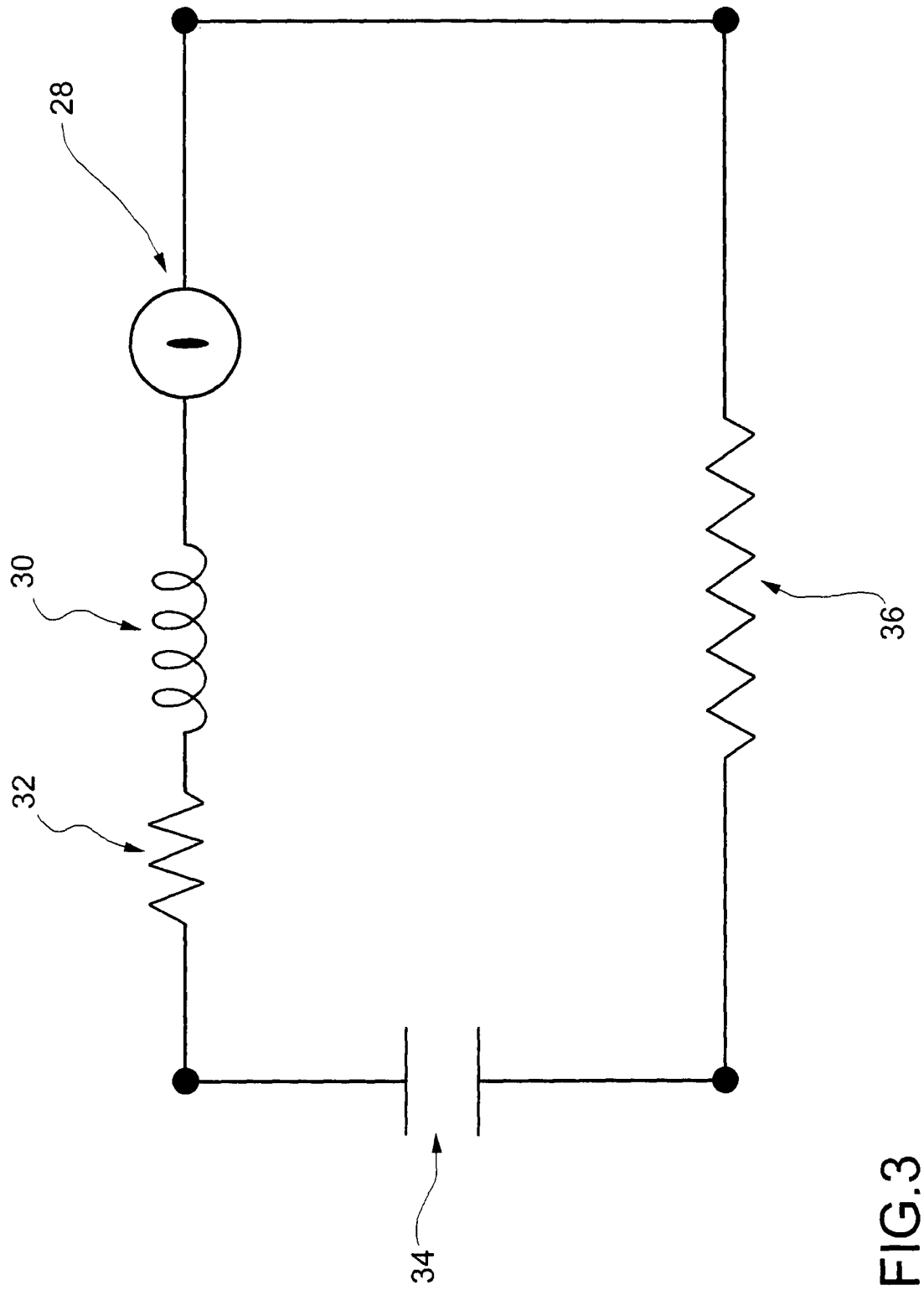
FIG. 3 is an equivalent circuit diagram of the power supply module.

FIG. 3 shows a equivalent circuit diagram of the magnetic core 20, of the conversion unit 24 and of the consuming appliance 26.

This circuit includes an equivalent voltage generator 28 of value $\omega * M * I_P$ representing the no-load voltage $V_0$, an inductance 30 of value L linked in a known manner to the secondary winding flux $\Phi_S$, an internal resistance 32 of value $R_i$ representing the total losses of the core 20 and of the solenoid 22, a capacitance 34 of value C representing the conversion unit 24 and a load resistance 36 of value $R_C$ representing the consuming appliance 26.

Returning to the description of the physical principles on which operation of the power supply module 10 is based, both the losses in the magnetic material of the core 20 and the losses caused by the secondary winding 22 shall be temporarily disregarded, in a way known per se.

This means that the internal resistance 32 has a value of zero and the N turns are closed in a circuit comprising only the load resistance 36 and the capacitance 34, which is in perfect resonance with the inductance 30. In this hypothesis, the no-load voltage $V_0$ generates a secondary current $I_S$ in the solenoid 22 equal to:

$$I_S = \frac{V_0}{R_C} = \frac{\omega * M * I_P}{R_C} \tag{5}$$

This current generates the secondary winding flux $\Phi_S$ that is closely coupled to the magnetic core 20.

The presence of the primary winding flux $\Phi_P$ and the secondary winding flux $\Phi_S$ generates respectively a primary induction $B_P$ and a secondary induction $B_S$ equal to:

$$B_P = \frac{M * I_P}{S * N} \tag{6}$$

$$B_S = \frac{L * I_S}{S * N} \tag{7}$$

where S is the section of the core and L is the inductance of the equivalent circuit.

The total magnetization $B_g$ of the magnetic core 20 is given by the resultant vector of the two inductions:

$$\vec{B}_g = \vec{B}_P + \vec{B}_S \quad (8)$$

In perfect resonance conditions, the currents $I_P$ and $I_S$ are in phase quadrature with each other, as are the vectors $B_P$ and $B_S$.

Figure 4A:
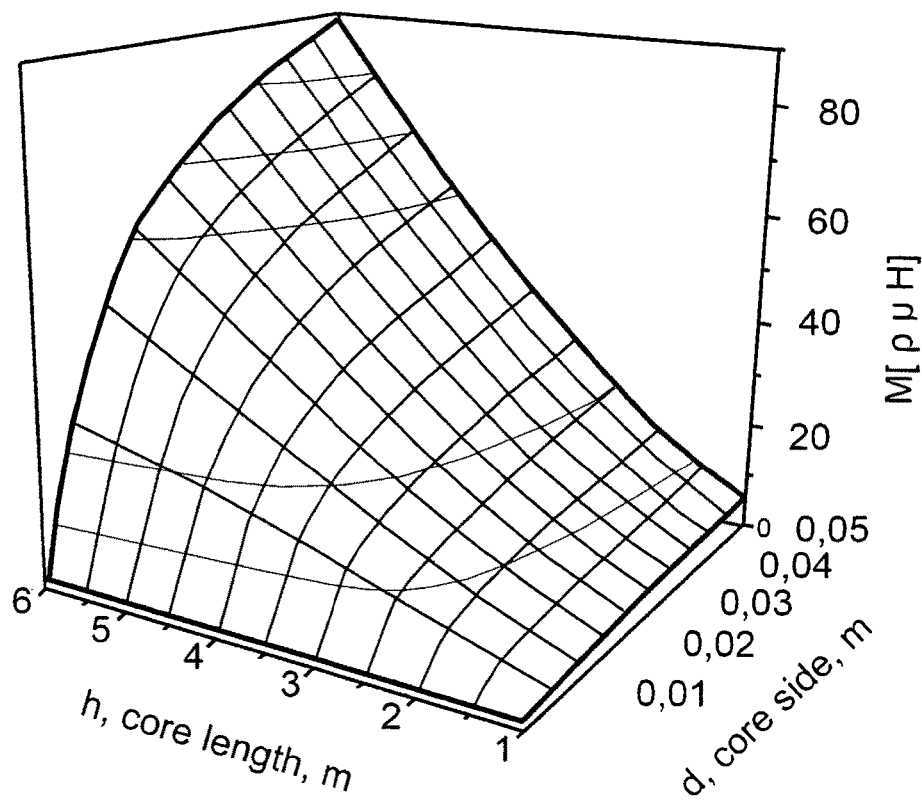
FIG. 4*a* is a graph showing the trend in mutual induction as a function of the dimensions of the core.
Figure 4B:
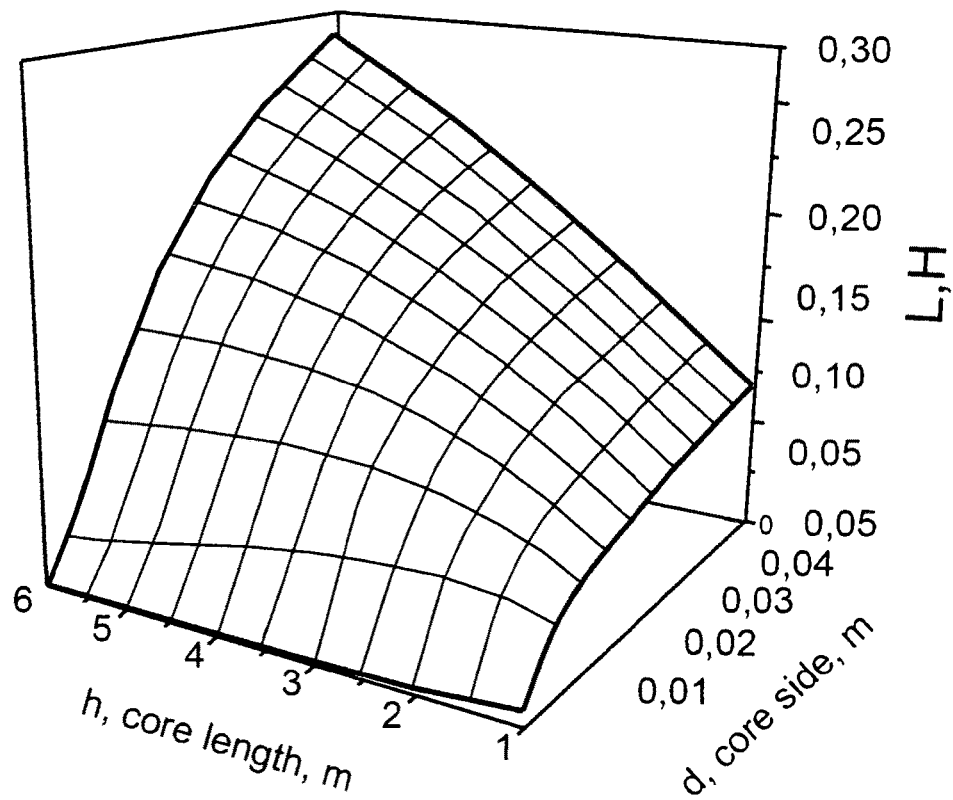
FIG. 4*b* is a graph showing the trend in self-induction of the core as a function of the dimensions of the core.
Figure 4C:
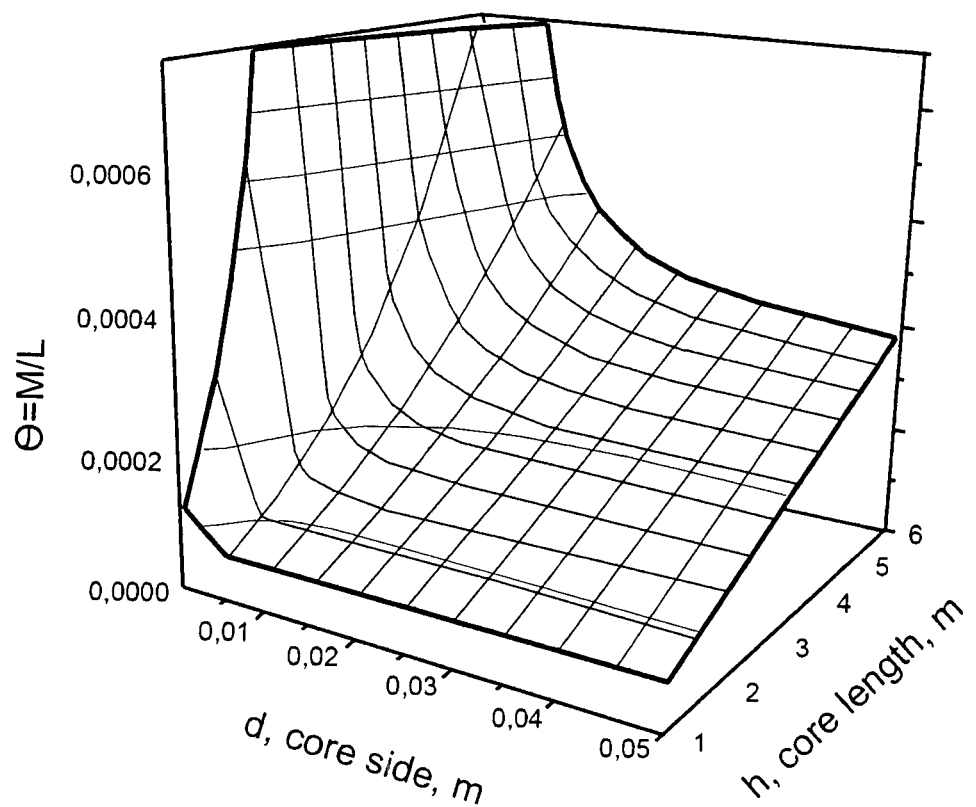
FIG. 4*c* is a graph showing the trend in the ratio between mutual induction and self-induction of the core as a function of the dimensions of the core.

The graphs in FIGS. 4a, 4b and 4c are used to analyse the values (modulo) of $B_P$ and $B_S$. These graphs are the result of calculations performed by the inventor considering, for the purposes of said calculations, a metal bar positioned at 4 meters from a conductor, having a relative magnetic permeability $\mu_r$ of $10^5$, 500 turns on the secondary winding, and with different bar lengths h and diameters d. The graphs in FIGS. 4a-4c can be used to obtain the values of M, L and $\theta = M/L$.

For example, with a bar of length h equal to 4 m and of diameter equal to 5 cm, the value of $\theta$ is approximately 0.0002.

If there is a secondary current $I_S$ equal to the primary current $I_P$, the ratio $B_P/B_S$ matches the value of $\theta$, i.e. 0.0002.

This means that it is sufficient to have a secondary current $I_S$ equal to 1 A to obtain an induction equivalent to that generated by a primary current $I_P$ of 5,000 A.

In operating conditions of a power transmission line, the primary current $I_P$ usually remains below 1,500 A, whereby the magnetization of the magnetic core 20 is primarily due to the secondary current $I_S$ (and therefore to the secondary induction $B_S$).

The average power $P_g$ generated by the conductor 14, by the core 20 and by the solenoid 22 on the load resistance $R_C$ is given by the following formula:

$$P_g = \frac{\omega * I_P * B_S * N * S * M}{L} \quad (9)$$

Given that $\theta = M/L$ it can be written:

$$P_g = \omega * I_P * B_S * N * S * \theta \quad (10)$$

Supposing $\Delta = N * S * \theta$ gives:

$$P_g = \omega * I_P * B_S * \Delta \quad (11)$$

The graph in FIG. 4c shows that $\theta$ is proportional to the length of the magnetic core 20 and independent of S. Furthermore, $\theta$ is known to be inversely proportional to the number of turns N.

Other calculations similar to the ones described above (the resulting graphs of which have not been shown) carried out by the inventor demonstrated that $\theta$ is also independent of the relative magnetic permeability $\mu_r$ of the bar, in the case of permeability $\mu_r$ greater than 30,000.

The expressions set out above show that the factor $\Delta$ is proportional to the length of the magnetic core 20 and to S while it is invariant in relation to N and $\mu_r$.

This shows that the generated power $P_g$ is directly influenced by the volume of the magnetic core 20, while being independent of N and of $\mu_r$ (for $\mu_r > 30,000$).

Analysing expression (9) reveals that the generated power $P_g$, all other conditions such as network frequency, the material of the core 20, the value of the primary current $I_P$ etc., being the same, is dependent on the volume of the core 20. This means that cores with different weights may be made as a function of the power to be supplied. Preferably, the core 20 should weigh less than 100 kg.

Increasing the primary current $I_P$ increases the no-load voltage $V_0$ and consequently also the secondary current $I_S$ (and therefore the secondary induction $B_S$).

If no limits are imposed (free fluctuation operation), varying the primary current $I_P$ causes the generated power $P_g$ to increase according to the square law:

$$P_g = \frac{(\omega * M * I_P)^2}{R_C} \quad (12)$$

This free fluctuation operation of the magnetization ends when the no-load voltage $V_0$ induces a secondary current $I_S$ that causes a secondary saturation induction $B_{SS}$ on the magnetic core 20 equal to the saturation value of the material of the magnetic core 20. This occurs for a secondary saturation current $I_{SS}$ equal to:

$$I_{SS} = \frac{S * N * B_{SS}}{L} \quad (13)$$

This secondary saturation current $I_{SS}$ occurs at a primary saturation current $I_{PS}$ equal to:

$$I_{PS} = \frac{S * N * R_C * B_{SS}}{L * M * \omega} \quad (14)$$

When this saturation value has been reached, the material of the magnetic core 20 is saturated and reducing its magnetic permeability no longer connects the primary flux 4p cancelling out the induced voltage $V_0$, the mutual inductance M tends towards zero and therefore the generated power $P_g$ is quickly reduced to zero.

Figure 5:
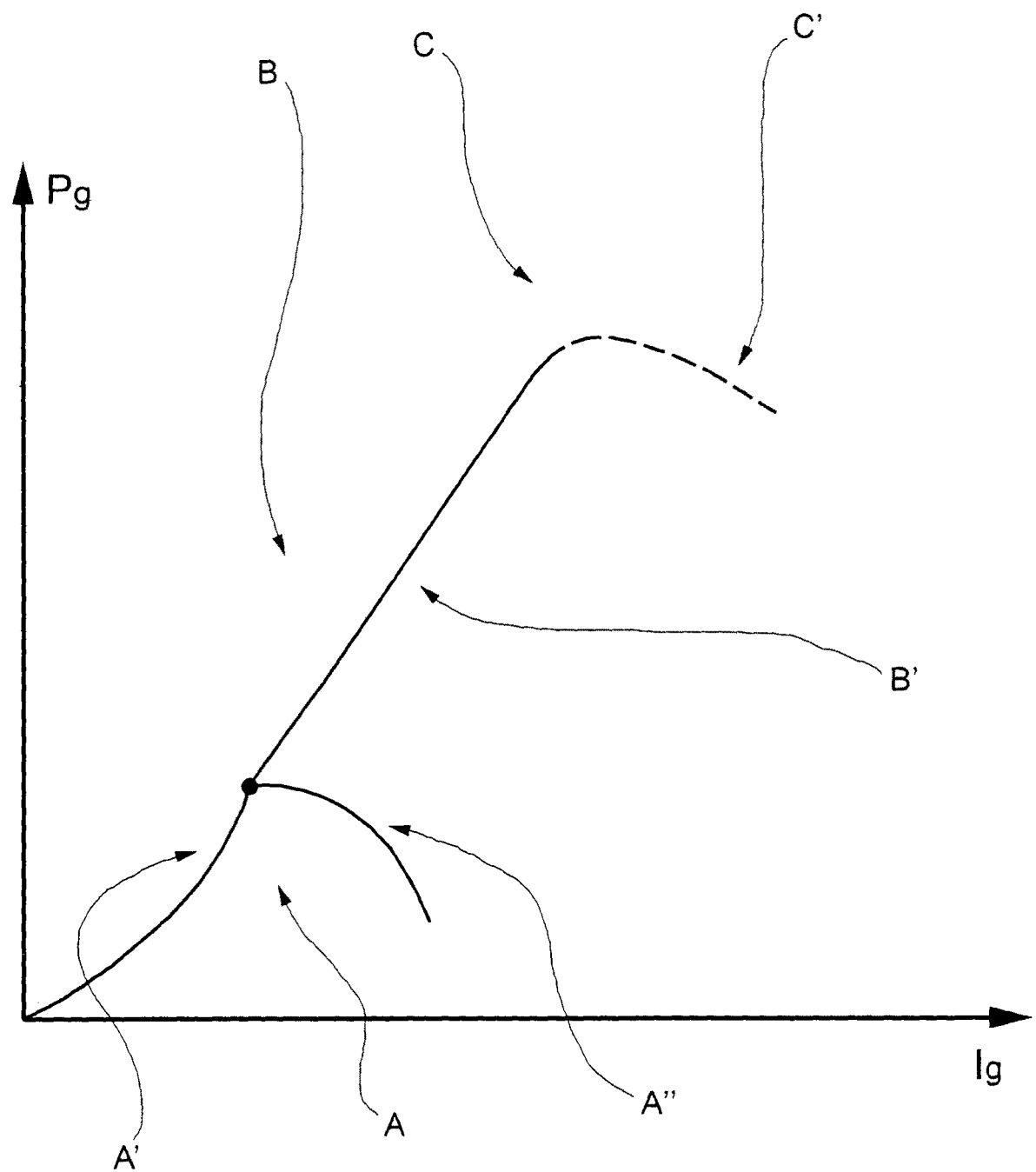
FIG. 5 is a graph showing the generated power as a function of the primary current.

FIG. 5 is a graph showing the generated power $P_g$ as a function of the primary current $I_P$.

A first curve A shows the trend in the free-fluctuation region. The curve A is given by the union of two branches A' and A".

One solution to the problem of zeroing the generated power $P_g$, according to the present invention, involves acting on the load resistance 36 when the secondary current $I_S$ approaches the secondary saturation current $I_{SS}$ to cause the secondary current $I_S$ to stop at an imposed current value $I_{SS1}$ below the secondary saturation current $I_{SS}$ by a predetermined amount, for example around 1%. This imposed current $I_{SS1}$ should at this point remain constant when the primary current $I_P$ increases (imposed magnetization operation).

The curve B in FIG. 5 represents this condition. The curve B is given by the union of two branches A' and B'.

The magnetic core 20 is then in an unsaturated magnetization state and the no-load voltage $V_0$ can increase as the primary current $I_P$ increases, causing the generated power to increase linearly:

$$P_g = V_0 * I_{SS1} = \omega * M * I_P * I_{SS1} \quad (15)$$

The generated power $P_g$ increases linearly until the primary induction $B_P$ induced by the primary current $I_P$, added vectorially to the second induction $B_S$, brings the magnetic core 20 to saturation.

To ensure that the magnetic core 20 reaches saturation, the primary current $I_P$ still needs to reach values of several thousands of amperes, thereby causing the no-load voltage $V_0$ to reach values able to damage the conversion unit 24.

To prevent this problem occurring, the magnetization of the magnetic core 20 needs to be controlled again.

The conversion unit 24 (FIG. 2), as described in greater detail below, is equipped with a voltage sensor that, when it detects that the voltage applied to the consuming appliance 26 (i.e. the input voltage of the converter described below) reaches a limit value (preferably the maximum value of the voltage permitted by the electronic components or by the heat dissipation of the system) permits the flow of a secondary current $I_S$ greater than the imposed current $I_{SS1}$. This causes the magnetic core 20 to become saturated, and the voltage applied to the consuming appliance 26, and consequently the generated power $P_g$ (forced saturation operation), is reduced.

The curve C in FIG. 5 represents this condition. The curve C is given by the union of the branches A', B' and C'.

This operation is also useful in instances where it is necessary to limit the power to be transferred to the consuming appliance 26 and to protect the conversion unit 24 from overcurrents (for example, line short-circuits).

The above description of the physical principles on which operation of the power supply module 10 is based considers the power $P_g$ transferred to the magnetic core 20 by the current flowing through the central cable 14 only.

Considering instead that the currents flow on all three cables 14, 16a and 16b, the power transferred to the core 20 varies as a function of the relative position of the core 20 in relation to the cables. To increase the power transferred to the core 20 compared with the case set out above, the core 20 (and therefore the power supply module 10) is positioned at a point of the pylon 12 such that one of the cables 14, 16a and 16b is positioned to the right of the core 10 and the other two cables are positioned to the left of the core 20.

In this way, the magnetic flux produced by the cable positioned to the right of the core 20 is added to the resultant vector of the magnetic flux produced by the cables positioned to the left of the core 20.

Figure 6:
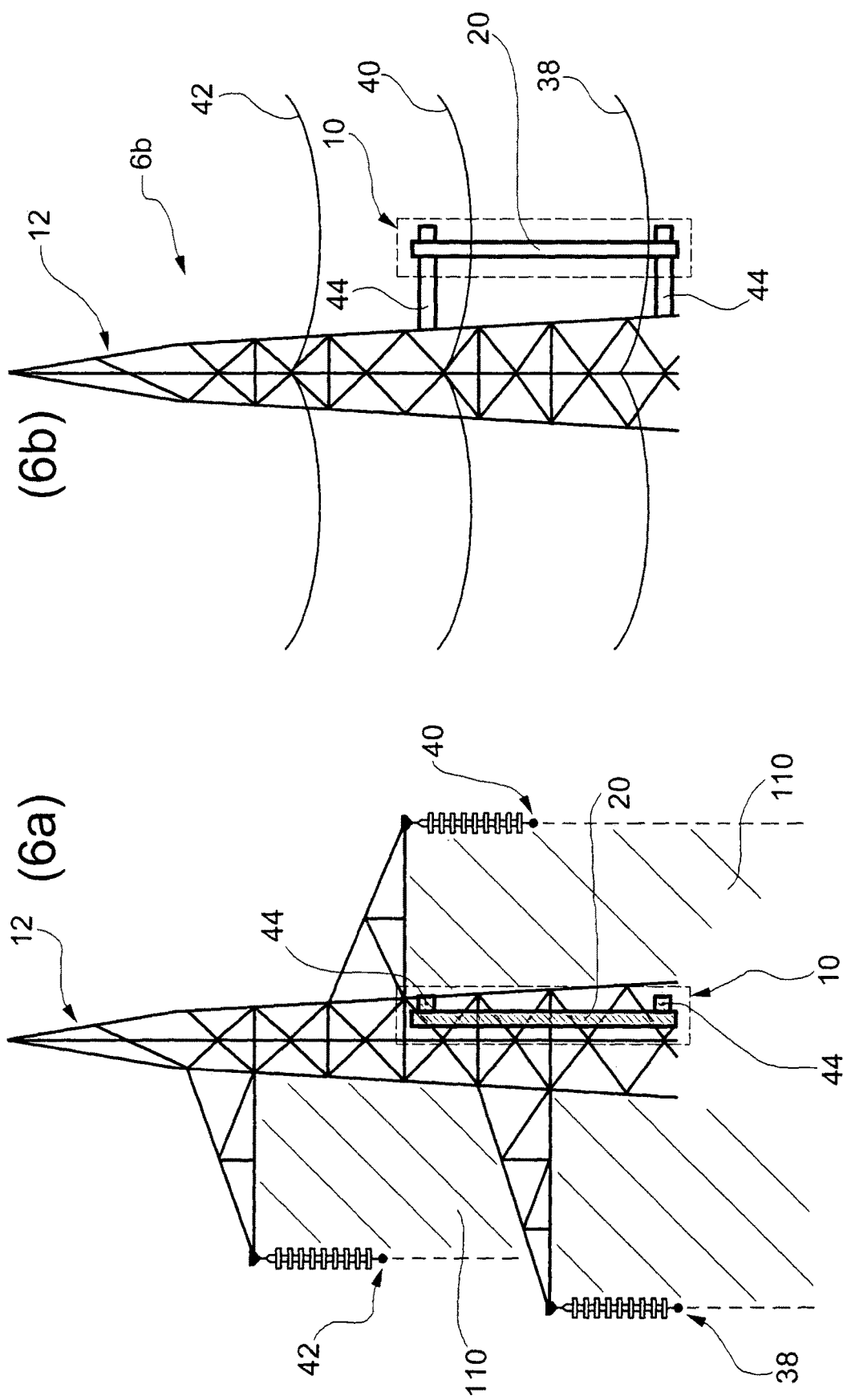
FIG. 6 is a front and side view of a pylon equipped with a power supply module according to the present invention.

FIG. 6 is considered below by way of example, showing two views of the pylon 12 (in this case a 150 kV pylon) on which the power supply module 10 is positioned.

FIG. 6a shows the pylon 12 from the front (i.e. the conductor cables 38, 40 and 42—corresponding to cables 14, 16a and 16b of the 380 kV pylon in FIG. 1—are perpendicular to the plane of the figure).

FIG. 6b shows the pylon 12 from the side (i.e. the conductor cables 38, 40 and 42—corresponding to the cables 14, 16a and 16b of the 380 kV pylon in FIG. 1—are parallel to the plane of the figure).

The positioning of the core 20 in relation to the three conductor cables 38, 40 and 42, as shown in FIG. 6, results in an approximately 60% increase of the generated power $P_g$ compared to the case in which there is only one conductor 40.

FIG. 6b also shows suspension and anchoring devices 44 for supporting the power supply module 10. These suspension and anchoring devices 44 may be made of magnetic or non-magnetic material. All of the considerations set out to this point (and below) apply to the use of non-magnetic suspension and anchoring devices 44 that magnetically isolate the power supply module 10 from the pylon 12. The aforementioned considerations are also valid if magnetic suspension and anchoring devices 44 are used. In this case, both the anchoring device 44 and the pylon 12 shall be considered to be partially part of the power supply module 10 (in particular part of the core 20).

In a variant of the present invention, to increase the generated power $P_g$, a tubular core 20 is used with a wall section S that diminishes progressively and symmetrically (from the centre of the core 20 towards the ends), such that the secondary induction $B_s$ is constant along the entire longitudinal axis of the core.

This provides cores that supply a generated power $P_g$ that is greater for the same core weight, or the same generated power $P_g$ with lighter cores.

Figure 7:
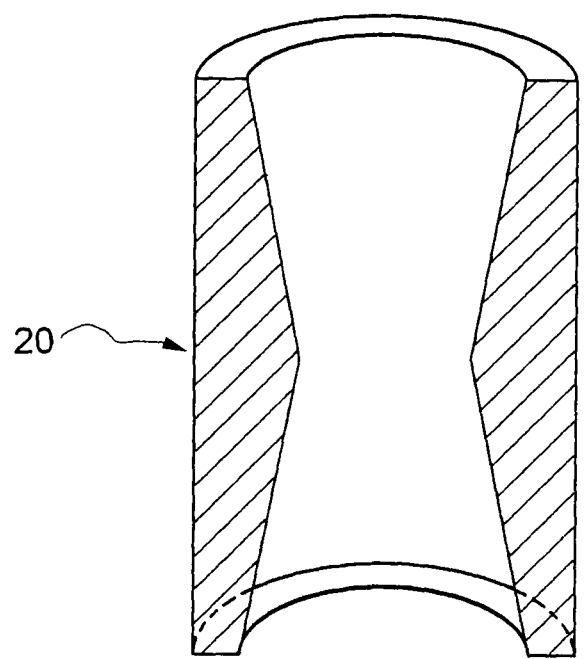
FIG. 7 is a longitudinal cross-section of a variant of the magnetic core.

FIG. 7 is a longitudinal cross-section of the core 20 according to this variant.

As previously mentioned, the description given above of the physical principles on which operation of the power supply module 10 is based disregard both the losses in the magnetic material of the core 20 and those caused by the secondary winding 22.

By taking such losses into consideration (and therefore, with reference to FIG. 3, an internal resistance 32 equal to $R_i$ greater than zero), it can be seen that the actual power supplied to the load $P_U$ is equal to:

$$P_U = P_g - P_P \qquad (16)$$

in which $P_g$ is the generated power and $P_P$ is the lost power.

This lost power $P_P$ is given by the sum of hysteresis losses and eddy-current losses in the core 20 and through dissipation in the metal of the secondary winding 22.

Analysis of the operation of the power supply module 10 in imposed magnetization operation shows that the losses in the metal of the secondary winding 22 are linked to the imposed current $I_{SS1}$, and as such are constant.

Similarly, the losses in the core 20, caused by hysteresis or eddy currents, are a function of the secondary induction $B_S$, which in turn depends on the imposed current $I_{SS1}$.

Since the imposed current $I_{SS1}$ is constant, the secondary induction $B_S$ is also constant, and consequently the losses in the core 20 are also constant.

The foregoing leads to the conclusion that, in imposed magnetization operation, the lost power $P_P$ being constant, the efficiency of the power supply module 10 increases as the primary current $I_P$ and therefore the generated power $P_g$, increases.

Figure 8:
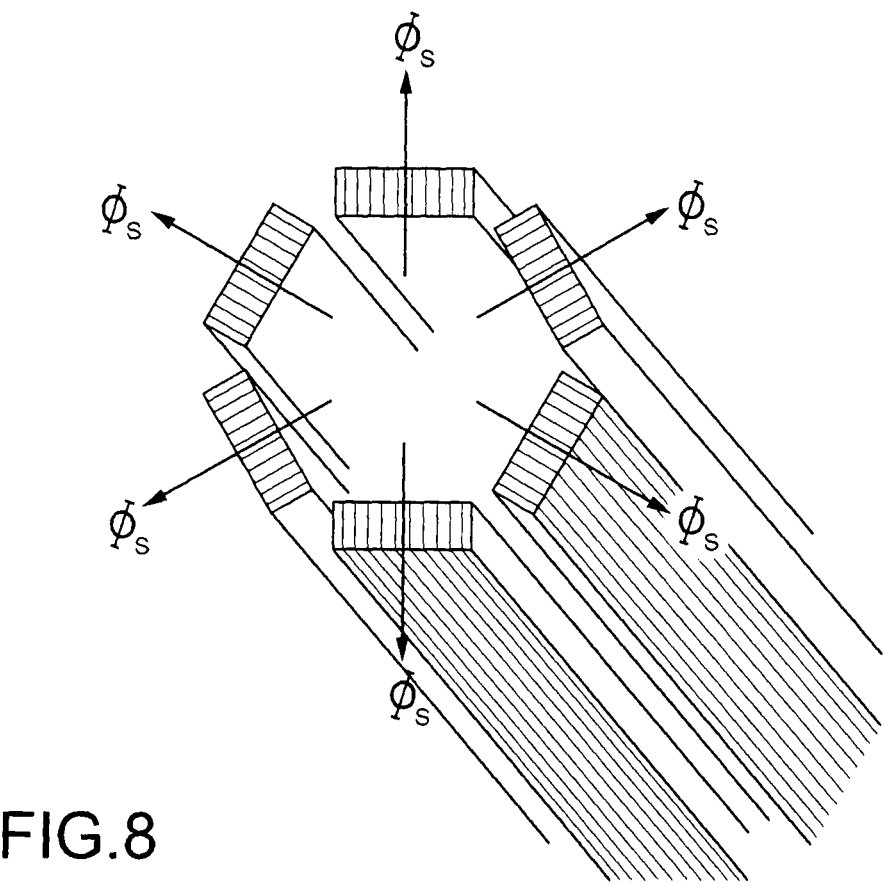
FIG. 8 is a transversal cross-section of the plates of the core.

In order to minimize the lost power $P_P$, and in particular to reduce the hysteresis and eddy-current components of the core 20, the following solutions are used:

Making the core 20 of nanocrystal or amorphous thin-strip magnetic materials with thicknesses preferably below 30 μm, widths preferably below 2 cm and losses per kg preferably below 0.1 W;

Designing the core 20 with a hollow section (see FIG. 8), obtained by positioning strips of magnetic material along the vertical axis of the core and arranging same transversally in relation to the radial component of the flux (such as to present the minimum possible surface area to the flux):

Designing the core with an elongated form.

FIGS. 4a and 4b, as well as expressions 4 and 9 lead to the conclusion that, in order to achieve a high no-load voltage $V_0$, and therefore low losses, it is necessary to have a high ratio between the length of the core and the diameter of the core (preferably greater than 20).

To achieve a high energy storage capacity while simultaneously maintaining the current deliverable to the consuming appliance 26 at levels of several amperes (to enable standard electronic components to be used inside the conversion unit 24), the magnetic core 20 needs to have an inductance preferably equal to 2 henry.

This high inductance has to be cancelled out to enable a correct purely resistive impedance matching (i.e. the consuming appliance 26 is shown by the pure load resistance 36).

The parameter and geometric variations both in the magnetic core 20 and in the suspension and anchoring devices 44 require the inclusion, inside the conversion unit 24 and as better described below, of a monitoring device (the command and control circuit described below) to control the transfer of power. This control is performed as a function of the current supplied to the consuming appliance 26.

The conversion unit 24 is described below in greater detail with reference to FIG. 9 et seq.

Figure 9:
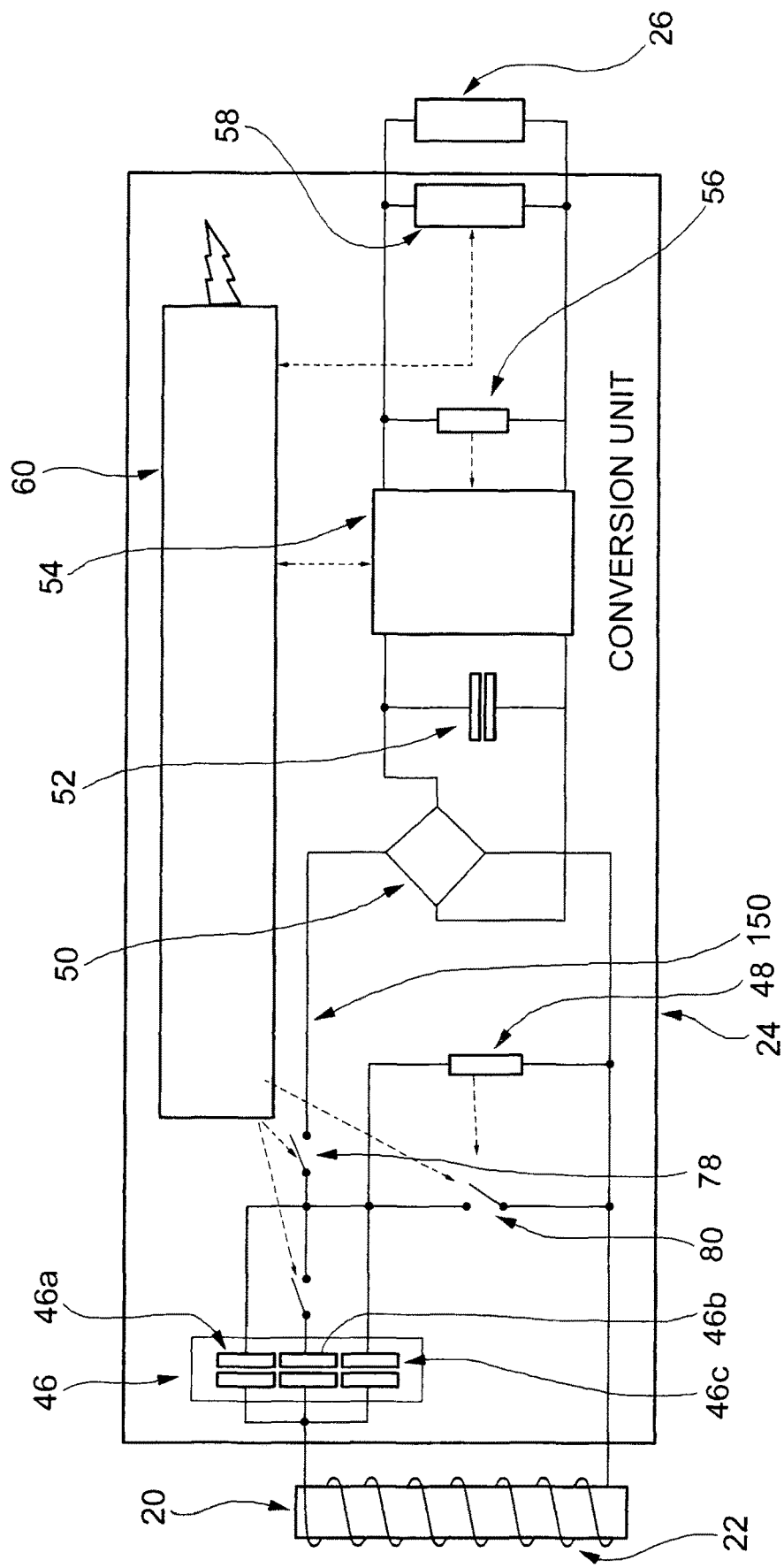
FIG. 9 is a complete circuit diagram of the conversion unit of the power supply module.

FIG. 9 shows a circuit diagram of the conversion unit 24 of the power supply module 10 according to the present invention.

As shown in said figure, in addition to the conversion unit 24, there is the magnetic core 20 and the consuming appliance 26.

The conversion unit 24 is a circuit that includes a variable capacitance block 46, an overvoltage protection module 48, a rectifier 50, a smoothing capacitance 52, a DC/DC converter 54, an accumulator voltage meter 56, an accumulator 58 and a command and control circuit 60.

Different portions of the circuit in FIG. 9 are described below with reference to FIG. 10 et seq., starting from a simplified version of said portions and progressively adding the different elements required to arrive at the final configuration shown in FIG. 9. The operation of said portions is also described, in order to define how the conversion unit 24 works as a whole.

Figure 10:
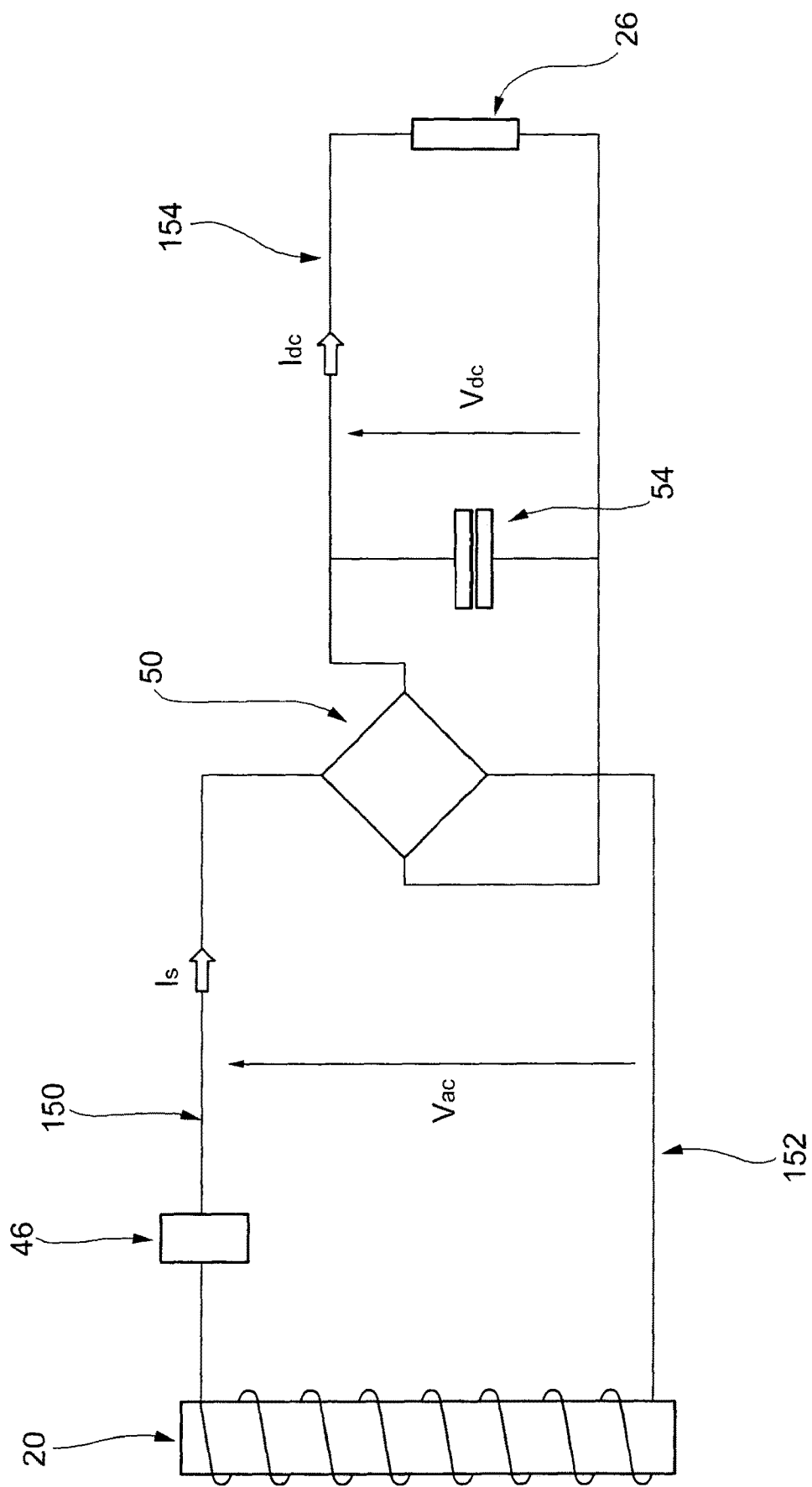
FIGS. 10 to 14 show details of portions of the circuit in FIG. 9.

FIG. 10 shows a first portion of the circuit in FIG. 9.

As discussed above, the magnetic core 20 has an inductive reactive portion that must be cancelled out by a capacitive reactance of the conversion unit 24 so that the total impedance of the circuit is represented by the loss resistance of the various components only. For this purpose, the variable capacitance block 46 (described in greater detail below) is present and connected to the solenoid 22 by a first connection branch 150.

The presence of the primary current $I_P$ in the central conductor 14 (not shown in the figure) produces, as discussed above, the secondary current $I_S$, which is an alternating current flowing through the first connection branch 150.

An alternating voltage $V_{ac}$ is associated with the secondary current $I_S$.

The variable capacitance block 46 is connected, via the first connection branch 150, to the rectifier 50, which is in turn connected to the solenoid 22 via a second connection branch 152.

The power present at the terminals of the rectifier 50 that is produced by the conductor 14, by the magnetic core 20 and by the solenoid 22 (the generated power $P_g$ discussed above) increases until the secondary current $I_S$ reaches the secondary saturation current $I_{SS}$ and then, if the secondary current $I_S$ increases further, this power $P_g$ drops practically to zero.

The generated power $P_g$ at the input of the rectifier 50 is given by:

$$P_g = \frac{1}{T}\int_{t0}^{t0+T} V_{ac} * I_S \quad (17)$$

and is transformed by the rectifier 50 (and by the converter 54, as described in greater detail below), less the rectification and conversion losses, into a supplied output power:

$$P_U = V_{dc} * I_{dc} \quad (18)$$

where $V_{dc}$ is a direct voltage present at the terminals of the consuming appliance 26 (or, as described in greater detail below, present at the input of the DC/DC converter 54 and processed as illustrated below) and $I_{dc}$ is a direct current flowing through a third connection branch 154 joining the rectifier 50 to the consuming appliance 26.

Given that the secondary current $I_S$ is sinusoidal, the root-mean-square value of same matches the value of the direct current $I_{dc}$, and as such controlling this latter makes it possible to control the secondary current $I_S$.

The smoothing capacitance 52, arranged in parallel with the rectifier 50, is used to reduce the ripple in the voltage output to the rectifier 50.

Figure 11:
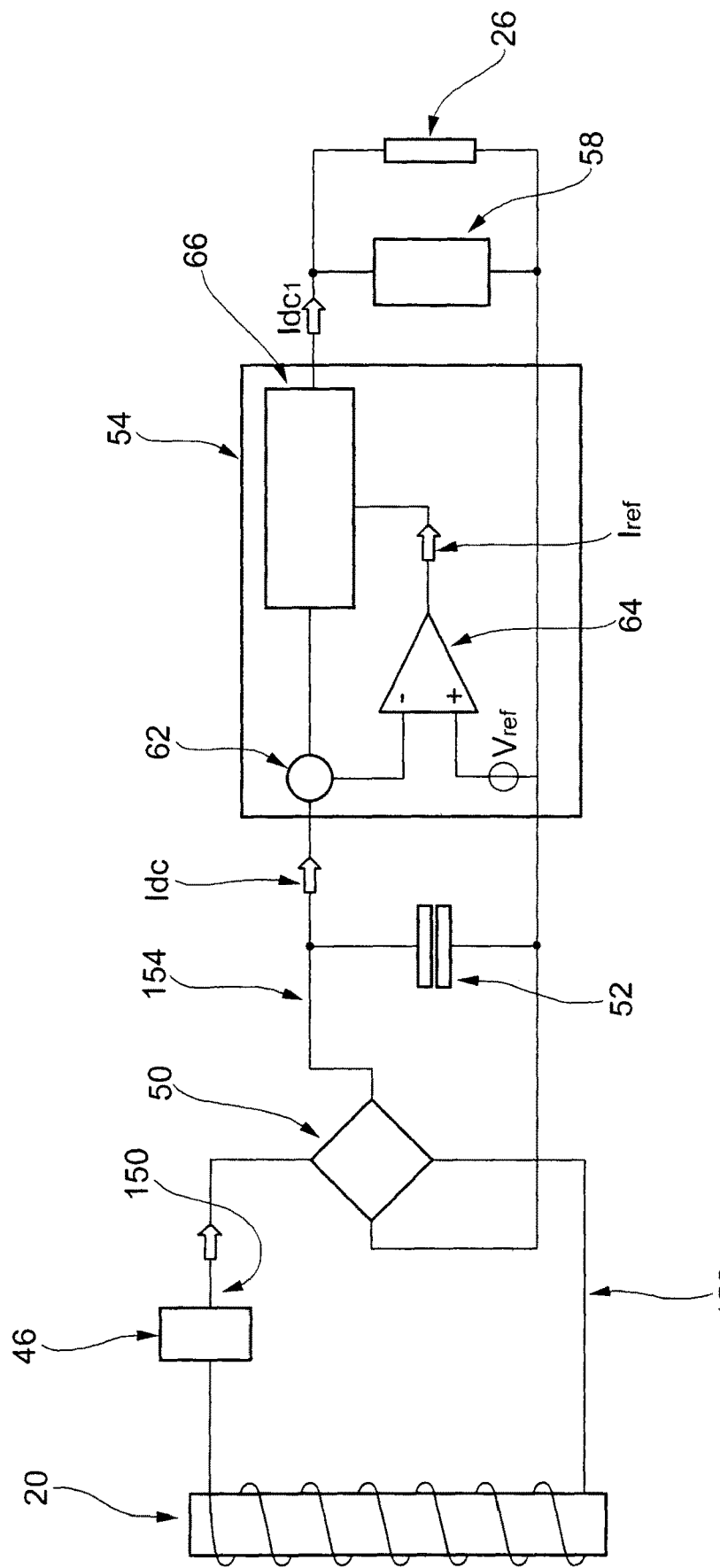

FIG. 11 shows the same portion of the circuit in FIG. 10, with some components added, in particular the DC/DC converter 54 and the accumulator 58.

The direct current $I_{dc}$ enters the converter 54 before reaching the consuming appliance 26. The converter 54 includes a current transducer 62 designed to receive the direct current $I_{dc}$ and to convert same into a comparison voltage $V_{Idc}$.

As an alternative to the foregoing, the secondary current $I_S$ is converted directly into the comparison voltage $V_{Idc}$ by a known transducer or is controlled by a known magnetic-field transducer placed in the magnetic core 20 and that generates a comparison voltage $V_{Bdc}$ that matches $V_{Idc}$.

The comparison voltage $V_{Idc}$ is compared, by an error amplifier 64, with a reference voltage $V_{ref}$; said error amplifier 64 producing a comparison current $I_{ref}$ that is input into a PWM module 66. Said PWM module 66 is connected, in a known manner, in a feedback loop with the error amplifier 64 and is able to produce an output current $I_{dc1}$. The PWM module 66 therefore keeps the output current $I_{dc1}$ constant due to the feedback loop with the amplifier 64.

By varying the reference voltage $V_{ref}$ in a known manner, it is possible to define the level of the output current $I_{dc1}$ at which the energy will be drawn from the magnetic core 20.

The converter 54 transforms the energy drawn from the magnetic core 20 into energy to be stored in the accumulator 58. The converter 54 therefore uses as input a constant current (the direct current $I_{dc}$) and a variable voltage (the direct voltage $V_{dc}$) dependent on the power available from the magnetic core 20, and transforms said power, less the efficiency, into a constant voltage imposed on the accumulator 58 and a variable current $I_{dc1}$ supplied to the consuming appliance 26.

Figure 12:
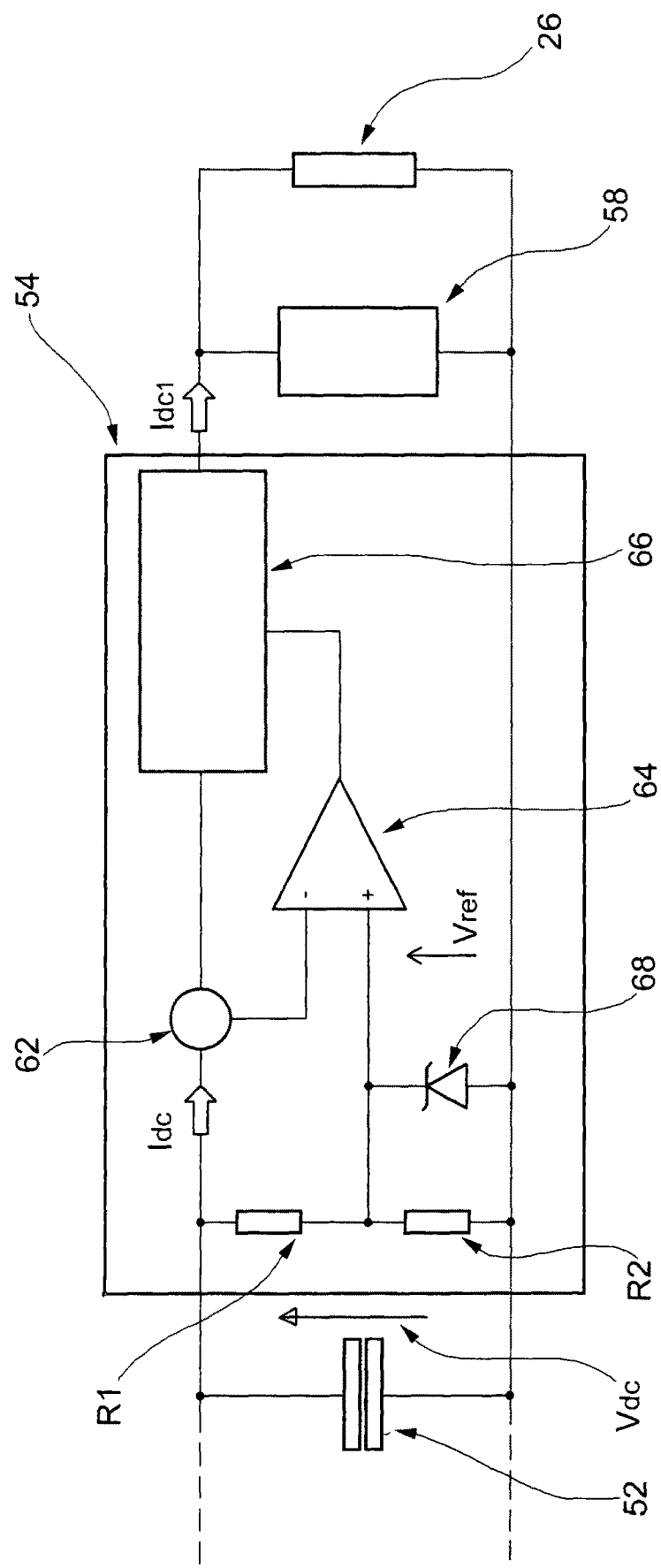

FIG. 12 shows a portion of the circuit in FIG. 11, in which components have been added to the converter 54.

On the non-inverting leg of the amplifier 64 are placed a first division resistance R1 in series with a second division resistance R2, said resistances R1 and R2 being arranged in parallel with the smoothing capacitance 52, and a first Zener diode 68 arranged in parallel with the second division resistance R2. The reference voltage $V_{ref}$ is obtained by applying the direct voltage $V_{dc}$, at the terminals of the smoothing capacitance 52, to the divider of the converter 54.

By varying the division ratio:

$$R = \frac{R2}{R1 + R2} \quad (19)$$

it is possible to control the resistance value of the converter 54.

In linear operation, the maximum power transfer from the magnetic core 20 to the consuming appliance 26 occurs when the resistance of the consuming appliance 26 is equal to the loss resistance of the conversion unit 24. The generated power $P_g$ transferred from the magnetic core 20 to the consuming appliance 26 increases quadratically until the secondary current $I_S$ is close to the secondary saturation current $I_{SS}$, which corresponds to an input voltage to the converter 54 (the direct voltage $V_{dc}$) equal to:

$$V_{switch} = I_{dc} * R \qquad (20)$$

When the input of the converter 54 reaches a voltage of $V_{switch}$, the Zener diode 68 becomes conductive, the direct current $I_{dc}$ (and therefore the output current $I_{dc1}$) can no longer increase and therefore the generated power $P_g$ begins to increase linearly as the primary current $I_P$ increases.

When the direct voltage $V_{switch}$ is equal to the reference saturation voltage $V_{ref}$, the converter 54 is saturated and consequently, when increasing the primary current $I_P$, the secondary current $I_S$ (and therefore also the related direct current $I_{dc}$ and output current $I_{dc1}$) remains blocked at the value of the secondary saturation current $I_{SS}$.

Consequently, to ensure the correct operation of the conversion unit 24, $V_{ref}$ is set to a value that is a predetermined quantity (for example 1%) less than the saturation voltage $V_{switch}$ such that the output current $I_{dc1}$ remains equal to a threshold value associated with the imposed current value $I_{SS1}$ (i.e. the secondary current $I_S$ is supposed to be equal to the imposed current $I_{SS1}$, so, given that the secondary current $I_S$ is linked—as described above—to the output current $I_{dc1}$, this latter must be kept equal to a threshold value so that the associated secondary current $I_S$ is equal to the imposed current $I_{SS1}$).

Alternatively, the output current $I_{dc1}$ could be controlled using a known magnetic-field transducer positioned in the magnetic core 20.

The supplied power $P_U$ that reaches the consuming appliance 26 is given, as specified above, by the difference between the generated power $P_g$ and the losses.

Figure 13:
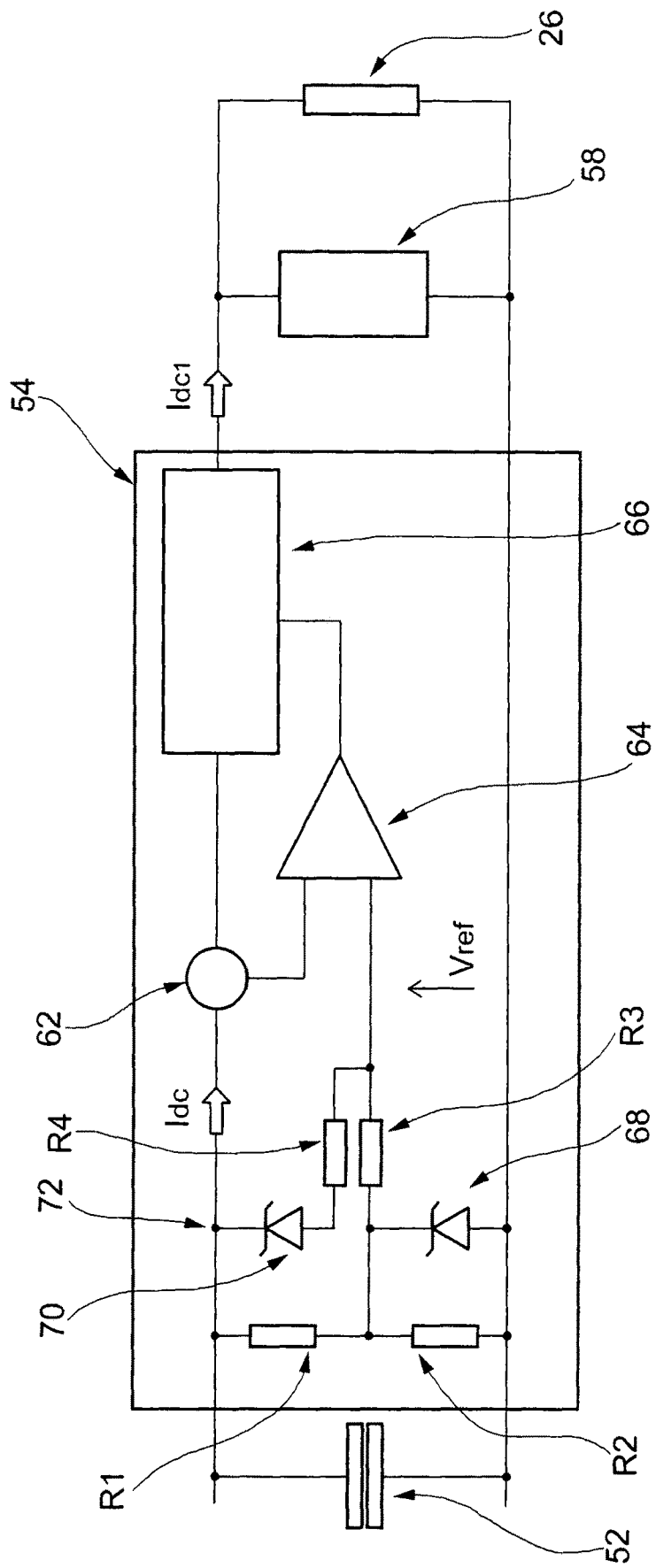

FIG. 13 shows the same portion of the circuit in FIG. 12, in which more components have been added to the converter 54.

In particular, a third resistance R3 has been added to the non-inverting leg of the amplifier 64, and a fourth resistance R4 and a second Zener diode 70, arranged in series with the fourth resistance R4, are connected between a connection point 72 positioned on the non-inverting leg of the amplifier 64 (between the first resistance R1 and the current transducer 62) and the non-inverting terminal of the amplifier 64.

The second Zener diode 70, the third resistance R3 and the fourth resistance R4 together form the voltage sensor mentioned on page 16.

The generated power $P_g$ increases linearly as the primary current varies, up to a maximum permissible value equal to:

$$P_{max} = I_{sat} * V_{MAX} \qquad (21)$$

where $V_{MAX}$ is the direct voltage $V_{dc}$ equal to the conducting-state voltage of the second Zener diode 70. Consequently, when it reaches this conducting-state voltage $V_{MAX}$, the second Zener diode 70 becomes conductive and, through the resistance divider formed by the third and fourth resistances R3 and R4, increase the direct current $I_{dc}$ (and therefore the output current $I_{dc1}$). This causes a consequent increase in the secondary current $I_S$ until this latter exceeds the value of the secondary saturation current $I_{SS}$.

Consequently, the generated power $P_g$ is reduced and the increase in the voltage $V_{dc}$ is stopped.

Figure 14:
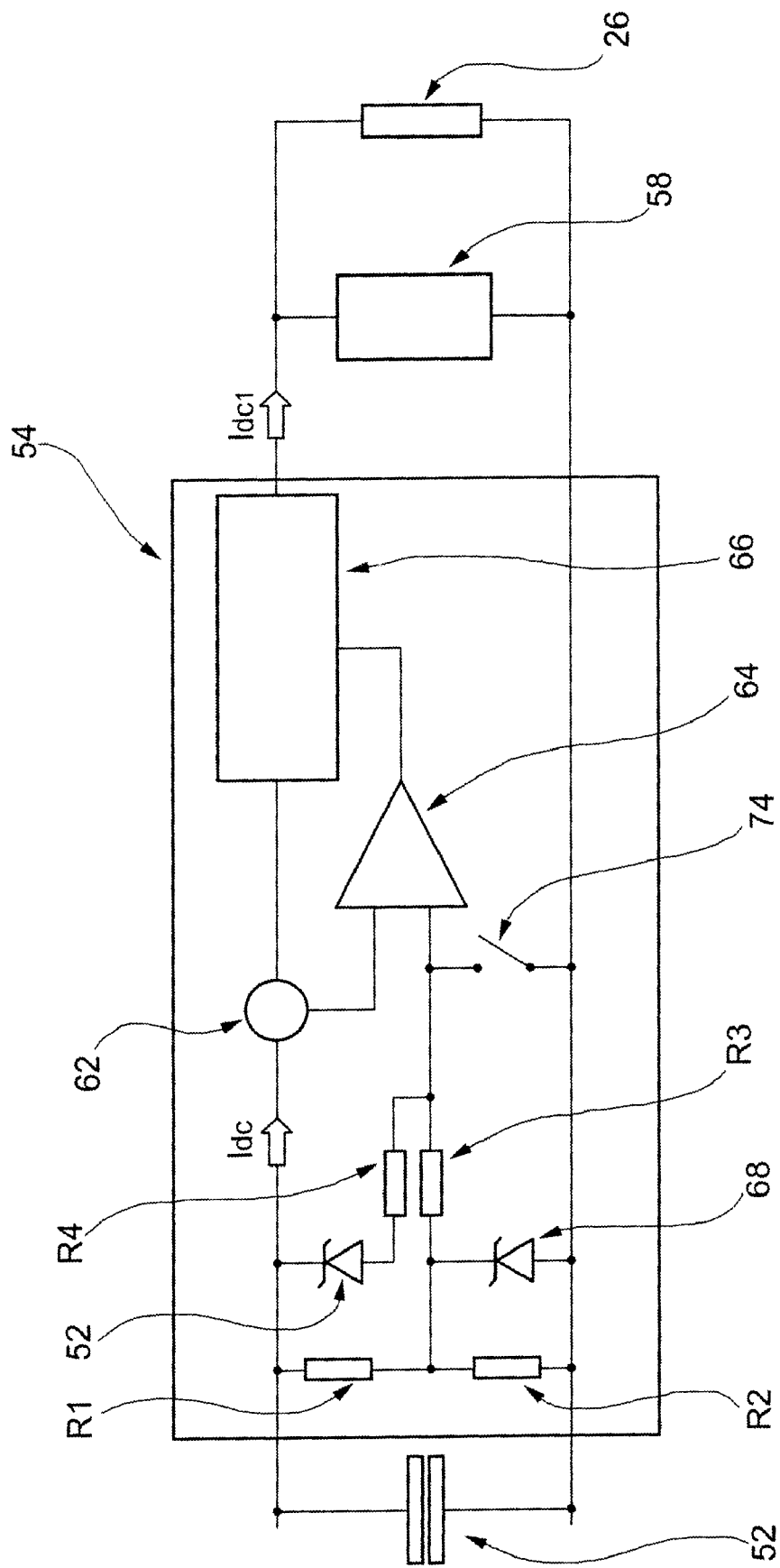

FIG. 14 shows the same portion of the circuit as FIG. 13, with the addition on the non-inverting leg of the amplifier 64, of a switch 74 designed to be opened by the command and control circuit 60 (thereby zeroing the reference voltage $V_{ref}$) if it is desired to cancel out the power supplied to the consuming appliance (for example when the accumulator 58 reaches the maximum storage voltage).

As an alternative to the foregoing, the conversion unit 24 outputs an alternating current $I_{ac}$ (in place of the direct current $I_{dc}$) which is then converted, in a known manner, into direct current to be supplied to the consuming appliance 26. In this case, the conversion unit does not include the rectifier 50.

Returning to FIG. 9, the variable capacitance block 46 advantageously includes a fixed capacitance 46a, an adjustment capacitance 46b and a variable-control capacitance 46c, said capacitances being controlled in a known manner by the command and control circuit 60 to modify the overall capacitance value of the block 46 in order to cancel out the reactive portion of the solenoid 22. The adjustment capacitance 46b can be disconnected by a switch 76, controlled by the command and control circuit 60, bringing the system entirely off-resonance in order to cancel out the power contribution to the conversion unit 24.

There is also a switch 78 controlled by the command and control circuit 60 that is used to connect the capacitance block 46 to the first connection branch 150 in order to start the power conversion. A third switch 80 is controlled by the overvoltage protection module 48 in order to short-circuit the secondary current $I_S$ to prevent power generation on the consuming appliance 26, in the event of failure. Alternatively, the switch 80 is driven by the command and control circuit 60.

Naturally, notwithstanding the principle of the invention, the embodiments and the implementation details may be varied significantly from the description and illustrations, which are provided purely by way of non-limiting example, without thereby moving outside the scope of the invention as defined in the attached claims.

The invention claimed is:

1. Method for obtaining power intended to supply a consuming appliance from a conductor traversed by a primary electrical current ($I_P$), said method being characterized in that it comprises the following steps:

placing, in a position remote from said conductor, a core of magnetic material and a conductive solenoid wound about said core to obtain a secondary current ($I_S$) in the solenoid from a magnetic field flux generated in said solenoid by said conductor, core and solenoid, said conductive solenoid being connected to the consuming appliance (26) by conversion means adapted to convert said secondary current ($I_s$) into a power ($P_g$) intended to supply the consuming appliance through a related voltage ($V_{dc}$, $V_{ac}$) and output current ($I_{dc1}$, $I_{ac}$), wherein the power ($P_g$) is produced to supply the consuming appliance through the related voltage ($V_{dc}$, $V_{ac}$) and output current ($I_{dc1}$, $I_{ac}$) using the following steps:

transforming the secondary current ($I_S$) into an intermediate current ($I_{dc}$) using a transducer;

converting the intermediate current ($I_{dc}$) into a comparison voltage ($V_{Idc}$); and comparing the comparison voltage ($V_{Idc}$) with a reference voltage ($V_{ref}$) to obtain the output current ($I_{dc1}$, $I_{ac}$) supplied to the consuming appliance;

when the power ($P_g$) supplied to the consuming appliance increases following the uncontrollable increase in the primary current ($I_P$) stopping the output current ($I_{dc1}$, $I_{ac}$) at a threshold value associated with an imposed current value ($I_{SS1}$) that is lower, by a predetermined quantity, than a secondary saturation current value ($I_{SS}$) of the magnetic material of the core; and when the power ($P_g$) applied to the consuming appliance increases following a further uncontrollable increase in the primary current ($I_P$), detecting the value of the voltage ($V_{dc}$, $V_{ac}$) applied to the consuming appliance (26) and when said value reaches a predetermined limit value ($V_{MAX}$) letting an output current ($I_{dc1}$, $I_{ac}$) greater than said threshold value flow, causing saturation of the core and consequently a reduction in the power ($P_g$) applied to the consuming appliance.

2. Method according to claim 1, wherein the step of checking when the output current (Idc1, Iac) reaches the first threshold value includes the step of determining when the voltage (Vdc, Vac) applied to the consuming appliance reaches a value close to a predetermined value (Vswitch).

3. A device for obtaining a power intended to supply a consuming appliance from a conductor traversed by a primary electrical current ($I_P$), said device being characterized in that it includes:

a core of magnetic material and a conductive solenoid wound about said core and connected to the consuming appliance, said core and solenoid being positioned in a position remote from said conductor;

a conversion unit connected to the solenoid and intended to be connected to the consuming appliance;

said conversion unit being adapted to transform at least a portion of the magnetic field flux generated in said solenoid by said conductor, magnetic core and solenoid into power ($P_g$) intended to supply the consuming appliance without there being any electrical contact with said conductor;

said conversion unit including:

a converter adapted to receive a secondary current ($I_S$) associated with the power ($P_g$) generated from said magnetic field flux and to transform same into an output current ($I_{dc1}$, $I_{ac}$) supplied to the consuming appliance;

a current transducer arranged for receiving the intermediate current ($I_{dc}$) and converting same into a comparison voltage ($V_{Idc}$);

an error amplifier connected to the current transducer that is adapted to compare said comparison voltage ($V_{Idc}$) with a reference voltage ($V_{ref}$) and to produce a comparison current ($I_{ref}$); and a PWM module in a feedback loop with the error amplifier that is adapted to receive the comparison current ($I_{ref}$) and to produce the output current ($I_{dc1}$, $I_{ac}$), and in that said conversion unit is arranged for:

when the power ($P_g$) supplied to the consuming appliance increases following the uncontrollable increase in the primary current ($I_P$), stopping the output current ($I_{dc1}$, $I_{ac}$) at a threshold value associated with an imposed current value ($I_{SS1}$) that is lower, by a predetermined quantity, than a secondary saturation current value ($I_{SS}$) of the magnetic material of the core; and when the power ($P_g$) applied to the consuming appliance increases following a further uncontrollable increase in the primary current ($I_P$), detecting the value of the voltage ($V_{dc}$, $V_{ac}$) applied to the consuming appliance and when said value reaches a predetermined limit value ($V_{MAX}$) letting an output current ($I_{dc1}$, $I_{ac}$) greater than said threshold value flow, causing saturation of the core and consequently a reduction in the power ($P_g$) applied to the consuming appliance.

4. Device according to claim 3, wherein the converter further includes:

a first division resistance (R1) arranged in series with a second division resistance (R2), said first and second division resistances (R1, R2) being positioned on the non-inverting leg of the amplifier;

a first Zener diode arranged in parallel with the second division resistance (R2), said first and second division resistances (R1, R2) and said first Zener diode being adapted to control the output current ($I_{dc1}$, $I_{ac}$).

5. Device according to claim 4, wherein the converter further includes:

a third division resistance (R3) positioned on the non-inverting leg of the amplifier;

a fourth division resistance (R4) and a second Zener diode arranged in series with said fourth resistance (R4), said fourth division resistance (R4) and second Zener diode being linked between a connection point placed on the non-inverting leg of the amplifier between the first division resistance (R1) and the current transducer and the non-inverting terminal of the amplifier;

said third and fourth division resistances (R3, R4) and said second Zener diode being adapted to cause the output current ($I_{dc1}$, $I_{ac}$) to exceed a first threshold value associated with a secondary saturation current ($I_{SS}$) such as to saturate the magnetic material of the core.

* * * * *